(12) United States Patent
Hartley et al.

(10) Patent No.: US 9,436,846 B2
(45) Date of Patent: Sep. 6, 2016

(54) SEMICONDUCTOR DEVICE AND A METHOD OF MANUFACTURING A SEMICONDUCTOR DEVICE

(75) Inventors: David H. Hartley, Seaview Downs (AU); Elkana Korem, Tsoram (IL)

(73) Assignee: FREESCALE SEMICONDUCTOR, INC., Austin, TX (US)

( * ) Notice: Subject to any disclaimer, the term of this patent is extended or adjusted under 35 U.S.C. 154(b) by 40 days.

(21) Appl. No.: 14/401,149

(22) PCT Filed: May 30, 2012

(86) PCT No.: PCT/IB2012/052715
§ 371 (c)(1),
(2), (4) Date: Nov. 14, 2014

(87) PCT Pub. No.: WO2013/179091
PCT Pub. Date: Dec. 5, 2013

(65) Prior Publication Data
US 2015/0100792 A1    Apr. 9, 2015

(51) Int. Cl.
*G06F 21/71* (2013.01)
*G06F 21/62* (2013.01)
(Continued)

(52) U.S. Cl.
CPC .............. *G06F 21/71* (2013.01); *G06F 13/16* (2013.01); *G06F 21/575* (2013.01); *G06F 21/62* (2013.01); *G06F 21/72* (2013.01); *G06F 21/79* (2013.01);
(Continued)

(58) Field of Classification Search
CPC ....................................................... G06F 21/71
See application file for complete search history.

(56) References Cited

U.S. PATENT DOCUMENTS 6,975,727 B1 * 12/2005 Vandergeest .......... H04L 9/0891
380/273
7,458,002 B2   11/2008 Fischer et al.
(Continued)

FOREIGN PATENT DOCUMENTS

CN         101673251 B     7/2014
JP        2010-277651 A    12/2010

OTHER PUBLICATIONS

Zhang, "A Survey of Digital Rights Management Technologies", 2011.*

(Continued)

*Primary Examiner* — Kenneth Chang
*Assistant Examiner* — Thaddeus Plecha

(57) ABSTRACT

A semiconductor device having a plurality of on-chip processors, a plurality of key RAMs, a plurality of key RAM controllers, a fuse bank, a fuse bank controller and a boot controller is described. The boot controller is arranged to, in a first programming stage, allocate a first array of fuses in the fuse bank in dependence on the size of a first device key for storing the first device key in the fuse bank and, during boot-time, provide the first device key to a first key RAM controller. The fuse bank controller is arranged to program the first array of fuses with the first device key in the first programming stage, provide the first device key to the boot controller during boot-time, and prevent access to the first device key in the fuse bank during run-time. The first key RAM controller is arranged to, during boot-time, store the first device key in the first key RAM, and, during run-time, restrict access to the first device key in the first key RAM to exclusive access by the first on-chip processor. The first on-chip processor is arranged to, during run-time, retrieve the first device key from the first key RAM (110) and use the first device key in the first key-protected processing.

19 Claims, 5 Drawing Sheets

(51) Int. Cl.
| | |
|---|---|
| *G06F 21/79* | (2013.01) |
| *G06F 21/72* | (2013.01) |
| *G06F 13/16* | (2006.01) |
| *G06F 21/57* | (2013.01) |
| *G09C 1/00* | (2006.01) |
| *H04L 9/08* | (2006.01) |
| *H04N 21/426* | (2011.01) |
| *H04N 21/443* | (2011.01) |
| *H04N 21/462* | (2011.01) |
| *H04N 21/4405* | (2011.01) |

(52) U.S. Cl.
CPC ............... *G09C 1/00* (2013.01); *H04L 9/0822* (2013.01); *H04L 9/0894* (2013.01); *H04N 21/42646* (2013.01); *H04N 21/4432* (2013.01); *H04N 21/4435* (2013.01); *H04N 21/462* (2013.01); *H04L 2209/12* (2013.01); *H04N 21/42692* (2013.01); *H04N 21/4405* (2013.01)

(56) References Cited

U.S. PATENT DOCUMENTS

| | | | |
|---|---|---|---|
| 7,801,308 B1 | 9/2010 | Hang | |
| 7,975,151 B2 * | 7/2011 | Coenen | G06F 21/123 |
| | | | 713/193 |
| 9,094,205 B2 | 7/2015 | Hartely et al. | |
| 2004/0151312 A1 | 8/2004 | Yanagisawa | |
| 2005/0027994 A1 | 2/2005 | Sai | |
| 2007/0242829 A1 * | 10/2007 | Pedlow, Jr. | H04N 7/162 |
| | | | 380/277 |
| 2010/0189262 A1 | 7/2010 | Ducharme et al. | |
| 2010/0205433 A1 | 8/2010 | Neill et al. | |
| 2012/0011373 A1 * | 1/2012 | Hakkarainen | G06F 21/10 |
| | | | 713/193 |
| 2012/0079279 A1 * | 3/2012 | Leclercq | H04L 9/0825 |
| | | | 713/187 |
| 2015/0074421 A1 * | 3/2015 | Nagai | H04L 9/0822 |
| | | | 713/189 |

OTHER PUBLICATIONS

International Search Report and Written Opinion correlating to PCT/IB2012/052715 dated Oct. 8, 2012.

Extended International Search Report for the International application No. PCT/IB2012/052715 dated Dec. 17, 2015.

* cited by examiner

SEMICONDUCTOR DEVICE AND A METHOD OF MANUFACTURING A SEMICONDUCTOR DEVICE

FIELD OF THE INVENTION

This invention relates to a semiconductor device and a method of manufacturing a semiconductor device.

BACKGROUND OF THE INVENTION

Several types of on-chip processors, such as for example high definition audio/video interfaces, must be protected with device-specific keys, available from the relevant interface licensing authority, for authentication and/or encryption. These device-specific keys may further be referred to with the term device keys. These device keys must be protected against disclosure, modification or cloning. On an applications processor, this includes protection against access to the device key for offline storage as well as run-time protection. Hence device keys are typically stored in arrays of on-chip one-time programmable non-volatile storage elements, such as on-chip fuse arrays, with access restricted to a dedicated co-processor, either via a private bus or a specially-protected private on-chip RAM. The device keys are typically programmed into the arrays of on-chip one-time programmable non-volatile storage elements by the manufacturer of the applications processor.

An applications processor with multiple video interfaces requires multiple device keys and therefore multiple on-chip fuse arrays, which may create scaling problems for the known approach. For example, a manufacturer of semiconductor devices may manufacture a single type of applications processor in multiple market segments via one or more original equipment manufacturers (OEMs). The OEM integrates the applications processor into some higher-level component, such as a consumer electronics device, according to an OEM design. Applications processors of the same type may thus be required to be suitable for use in a plurality of different OEM designs from one or more OEMs. For example, an applications processor may require up to six individual unique device keys of around 100 to over 2000 bits each for supporting the variety of OEM designs that the applications processor may be used in, and thus need at least six on-chip fuse arrays for storing all six device keys, which may correspond to over 12,000 fuses (six times over 2000 fuses). However, typical OEM designs need only need a subset of the video interfaces available on the applications processor, e.g. only one or two. Only one or two device keys are needed for these designs and the other four or five on-chip fuses of the total six on-chip fuse arrays would not be used. Also, some OEM designs may require device keys additional to the device keys programmed by the manufacturer, while known application processors do not allow easy handling and protecting device keys from different stakeholders. Known application processors may thus not be able to support OEM designs which require for example that keys licensed by a manufacturer must be protected against OEM-licensed software, and OEM-licensed keys must be protected against manufacturer's test patterns on field returns, while both keys licensed by the manufacturer and OEM-licensed keys need to be protected against end user software. Known application processors cannot support such requirements, as known applications processors may only offer a limited flexibility for storing and protecting various combinations of device keys licensed by multiple stakeholders.

SUMMARY OF THE INVENTION

The present invention provides a semiconductor device and a method of manufacturing a semiconductor device as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. Elements in the figures are illustrated for simplicity and clarity and have not necessarily been drawn to scale.

DETAILED DESCRIPTION OF THE PREFERRED EMBODIMENTS

In this document, the term 'chip' relates to a semiconductor device. The term 'fuse' relates to a one-time programmable non-volatile storage element. Such fuse may e.g. be a fuse commonly known as a polyfuse. The term 'device key' relates to a device-specific authentication and/or encryption key, usually available from the relevant licensing authority. An example of a device key is, e.g., a DTCP device key for a video interface protected with Digital Transmission Content Protection (DTCP) for encrypting interconnections between different devices in the so-called "digital home". Another example is a High-bandwidth Digital Content Protection (HDCP) device key associated with the High-Definition Multimedia Interface (HDMI), or DisplayPort. The term 'RAM' relates to a random access memory.

Figure 1:
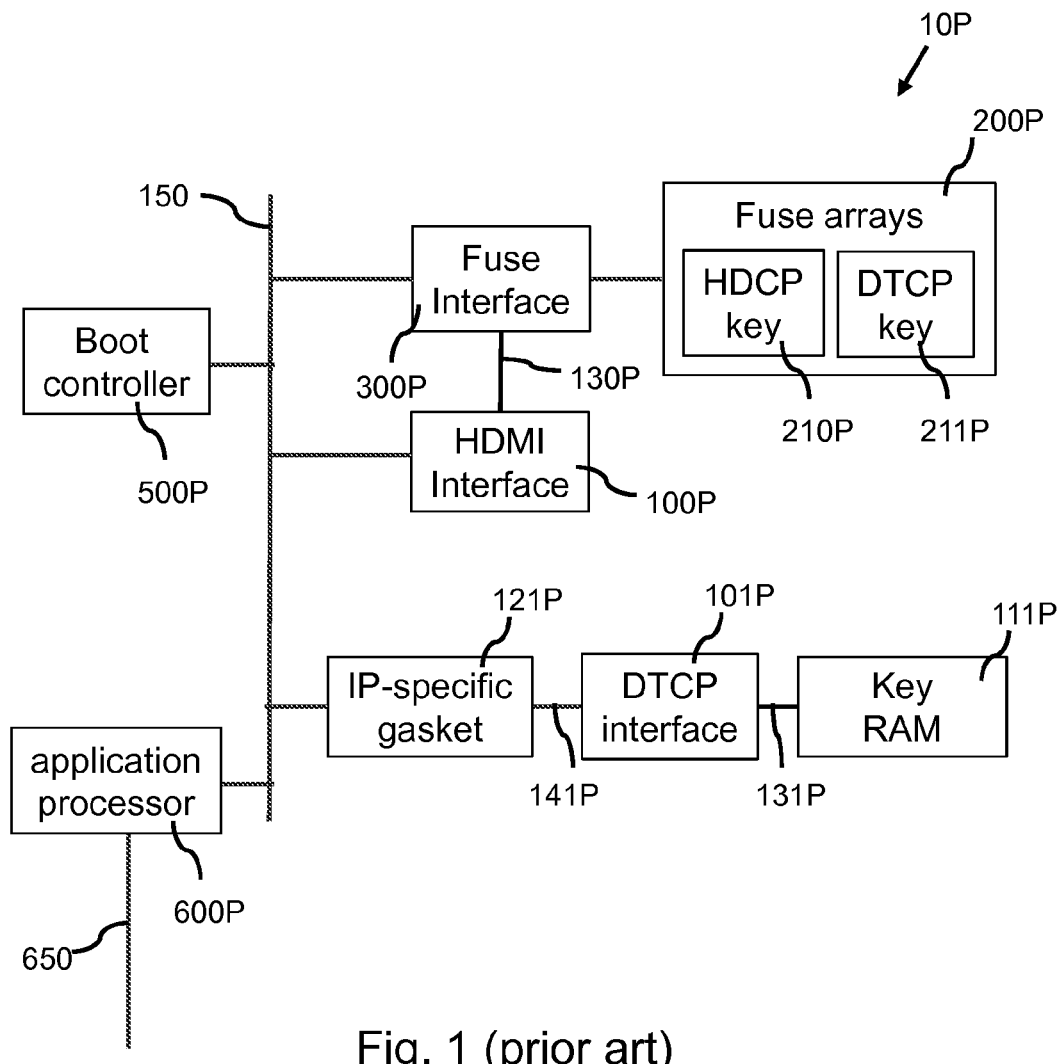
FIG. 1 schematically shows an example of a prior art semiconductor device having two multimedia interfaces with device key protection.

FIG. 1 schematically shows an example of a prior art semiconductor device 10P having two multimedia interfaces with device key protection. The semiconductor 10P is designed to provide an HDMI as well as a DTCP audio/video interface. The semiconductor device 10P has a HDMI audio/video interface 100P, a DTCP audio/video interface 101P, a plurality of fuse arrays 200P, a fuse interface 300P, a boot controller 500P and an on-chip bus 150. The plurality of fuse arrays 200P comprises a first array of one-time programmable fuses 210P dedicated to store a HDCP device key and a second array of one-time programmable fuses 211P dedicated to store a DTCP device key. After the semiconductor device 10P is manufactured and before the semiconductor device 10P is being shipped, e.g. to an OEM customer, the first array of one-time programmable fuses 210P is programmed by the device manufacturer to store a HDCP device key and a second array of one-time programmable fuses 211P is programmed by the device manufacturer to store a DTCP device key. As the HDCP device key and DTCP device key are programmed in the semiconductor device 10P, these device keys do not need to be distributed separately. The HDCP and DTCP device keys are licensed from the Digital Content Protection (DCP) and Digital Transmission Licensing Administrator (DTLA) authorities respectively, and are dedicated for the respective HDMI and DTCP audio/video interfaces 100P, 101P. The HDCP and DTCP device keys are programmed into the first and second arrays of one-time programmable fuses 210P, 211P by the device manufacturer The boot controller 500P comprises a known boot software library in on-chip ROM and runs boot code from the boot software library at boot-time. The boot controller 500P may further control the other modules connected to the on-chip bus 150. The HDMI audio/video interface 100P is arranged to read the HDCP device key via a dedicated bus 130P and the fuse interface 300P from the first array of fuses 210P during run-time, The combination of fuse interface 300P, plurality of fuse arrays 200P and private bus 130P thus creates a private-access HDCP key memory. The semiconductor device 10P further has a local key RAM 111P for storing at least the DTCP device key during run-time and a DTCP-specific gasket 121P for providing DTCP-specific access control via the on-chip bus 150. The boot controller 500P is arranged to copy the DTCP device key from the second array of one-time programmable fuses 211P via the DTCP-specific gasket 121P to the local key RAM 111P at boot-time, for providing the DTCP interface 101P with the DTCP authentication key during run-time via a private bus 131P. The combination of DTCP-specific gasket 121P, key RAM 111P and private bus 131P thus creates a private-access DTCP key memory. The DTCP-specific gasket 121P further allows software access to some parts of the key RAM 111P at run-time, while preventing access to the DTCP device key stored in the key RAM 111P.

The semiconductor device 10P further comprises an application processor 600P for interfacing with external devices via an off-chip bus 650P and for providing further functionality to the semiconductor device 10P.

The HDMI audio/video interface 100P, DTCP-specific gasket 121P, the fuse interface 300P, the boot controller 500P and the application processor 600P are all connected to the on-chip bus 150 and configured to communicate over the on-chip bus. The local key RAM 111P is connected to the DTCP interface 101P via the private bus 131P. The HDMI interface 100P is connected to the fuse interface 300P via a dedicated bus 131P. A semiconductor device with a plurality of HDCP-like interfaces may thus require a plurality of such dedicated busses 131P, which may lead to scaling problems when expanding the known architecture to such plurality.

The prior art semiconductor device 10P thus provides a HDMI as well as a DTCP audio/video interface wherein the associated HDCP and DTCP device keys are programmed by the manufacturer into respective, dedicated, one-time programmable fuse arrays.

Figure 2:
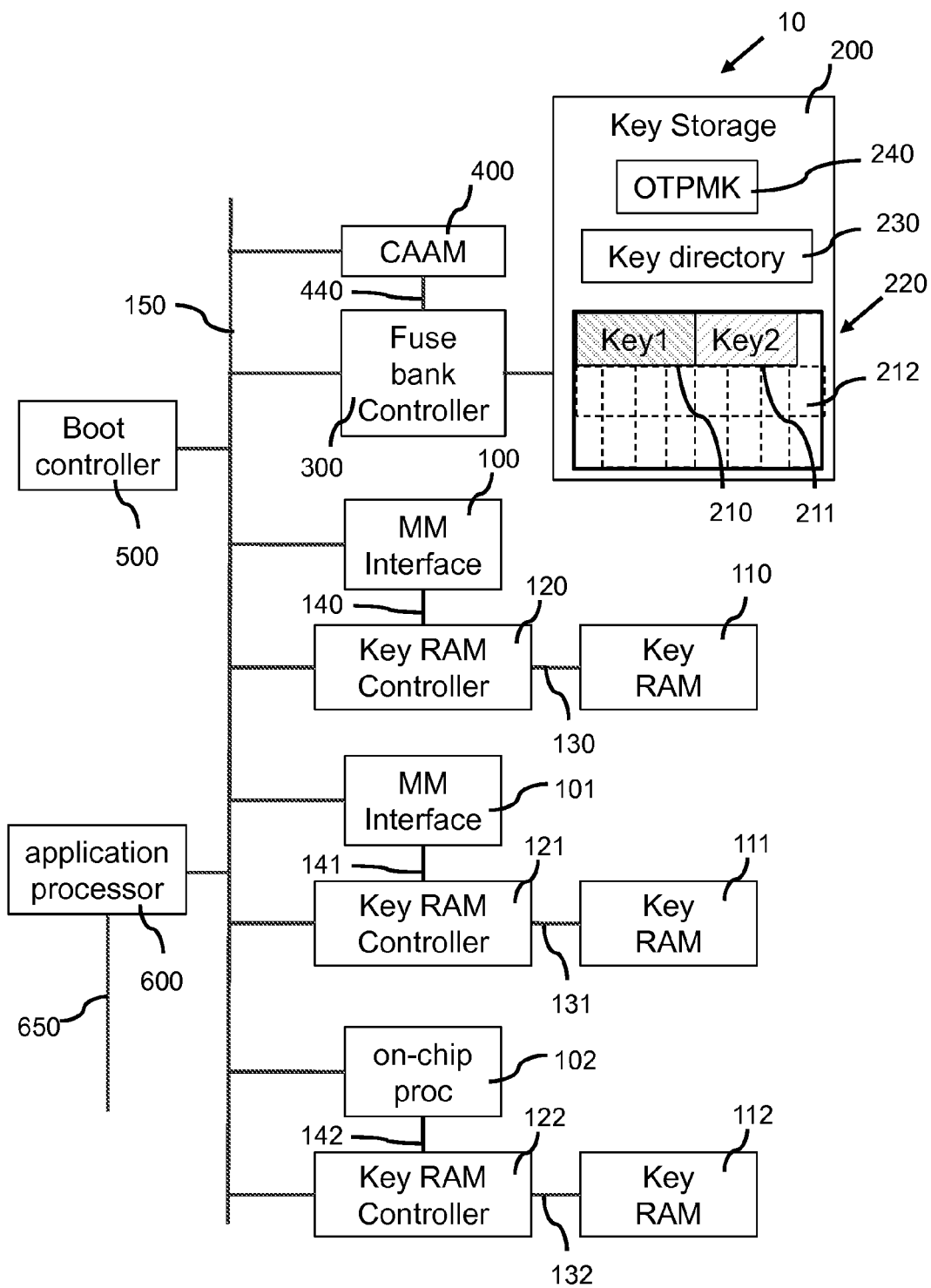
FIG. 2-4 schematically show examples of embodiments of a semiconductor device.

FIG. 2 schematically shows an example of an embodiment of a semiconductor device 10 having a plurality of on-chip processors capable to perform device key protected processing. The plurality of on-chip processors comprises a plurality of multimedia interfaces and a plurality of further on-chip processors with device key protection. In FIG. 2, a first multimedia interface 100 and a second multimedia interface 101 of the plurality of multimedia interfaces are shown. Also, one on-chip processor 102 of the further on-chip processors is shown. The semiconductor device 10 may have more multimedia interfaces than just the two multimedia interfaces 100, 101 shown. The semiconductor device 10 may have more further on-chip processors than just the further on-chip processor 102 shown. The semiconductor device 10 further comprises a fuse bank 200, a fuse bank controller 300, a cryptographic accelerator 400, a boot controller 500, an on-chip bus 150 and an application processor 600. The fuse bank 200 comprises a plurality of fuses that can be programmed via the fuse bank controller 300. Each of the plurality of fuses is addressable by its location, and arrays of fuses of any number of non-programmed fuses can be defined by a location and a size. A device key array 212 is reserved within the fuse bank 200 for storing device keys, and a key directory array 230 is reserved within the fuse bank 200 for storing a key directory with device key information. In the following, the same reference numeral 230 will be used to refer to the key directory array 230 and to the key directory 230. When the semiconductor device is programmed in one or more programming stages, the boot controller 500 and fuse bank controller 300 are arranged to cooperate to define, per programming stage of a (next) device key, an array of fuses in the device key array 212 in accordance of a number of bits of the (next) device key for storing the (next) device key in the fuse bank 200 and to program the (next) device key in the fuse bank according to the allocated location and size. Herein, the boot controller 500 and fuse bank controller 300 are arranged to cooperate to register first device key information, such the size, location and type, of the first device key, and to store the first device key information in the key directory 230 in in the fuse bank 200. For example, during a first programming stage, the first multimedia interface 100 could be made active by the device manufacturer programming a first device key of a type corresponding to the first multimedia interface in a first array of fuses allocated, during the first programming stage, for this purpose in the device key array 212 within the fuse bank 200 and recorded in the key directory 230. During a second programming stage, the second multimedia interface 101 could be made active by the device manufacturer by programming a second device key of a type corresponding to the second multimedia interface in in a second array of fuses allocated, during the second programming stage, for this purpose in the device key array 212 within the fuse bank 200 and recorded in the key directory 230. The multimedia interfaces of the plurality of multimedia interfaces and the further on-chip processor 102 remain inactive by not being programmed. Due to the use of the fuse bank 200 and the allocation of storage space, the disadvantage of prior art devices having dedicated fuse arrays for non-used multimedia interfaces and further non-used on-chip processors may hereby be overcome, while providing a flexibility and/or advantages by economy of scale. For example, a second semiconductor device may after having been manufactured be programmed with device keys of different types than the semiconductor device 10 described above. E.g., the second semiconductor device may be programmed in a first programming stage with a first device key associated with the first multimedia interface 100 and in a next programming stage with another device key associated with the further on-chip processor 102, by a different allocation of the corresponding arrays of fuses in the fuse bank 200.

In an embodiment, the fuse bank 200 further comprises an array of master key fuses 240, which are allocated for storing a one-time programmable master key (OTPMK). The master key is chip-specific for each semiconductor device 10. In this embodiment, the boot controller 500 and fuse bank controller 300 cooperate with the cryptographic accelerator 400 to encrypt the device key(s) before programming the device key(s) in encrypted form in the fuse bank 200, and—as is described below—to decrypt the device key in encrypted form to retrieve the device key for use by the corresponding on-chip processor. This may further improve the level of protection.

In the example given above, the first and second device keys are each licensed by the device manufacturer from the respective relevant authority for the respective multimedia interfaces 100, 101. In another example, the first device key is licensed and programmed by the device manufacturer and the second device key is licensed and programmed by an OEM manufacturer. This may provide further flexibility.

The semiconductor device 10 further has a first key RAM 110 associated with the first multimedia interface 100 for storing the first device key during run-time and a first key RAM controller 120 for restricting access to the first key RAM to exclusive access by the first multimedia interface 100. The semiconductor device 10 further has a second key RAM 111 associated with second first multimedia interface 101 for storing the second device key during run-time and a second key RAM controller 121 for restricting access to the second key RAM to exclusive access by the second multimedia interface 101. The boot controller 500 comprises a boot software library in on-chip ROM. The boot controller 500 is arranged to copy the first device key 210 from the first array of fuses to the first key RAM 110 and to copy the second device key 211 from the second first array of fuses to the second key RAM 111 in dependence on the key directory 230 at boot-time. This copying may be provided in such boot software library. The first key RAM 110 thus serves as a private access key memory for the first multimedia interface 100, whereas the second key RAM 111 serves as a private access key memory for the second multimedia interface 101. It will be appreciated that, if a further device key associated with the further on-chip processor 102 would additionally, or alternatively, be present in the fuse bank 200, the boot controller 500 would additionally, or alternatively, copy the further device key to a further key RAM 112 associated with the further on-chip processor 102 for storing the further device key during run-time and associated with a further key RAM controller 122 for restricting access to the further key RAM to exclusive access by the further on-chip processor 102.

The boot controller 500 comprises a boot software library in on-chip ROM and runs boot code from the boot software library at boot-time. The boot controller 500 may further control the other modules connected to the on-chip bus 150.

The application processor 600 provides interfacing with external devices via an off-chip bus 650 and provides further functionality to the semiconductor device 10.

The first multimedia interface 100, the first key RAM controller 120, the second multimedia interface 101, the second key RAM controller 121, the further on-chip processor 102, the further key RAM controller 122, the fuse bank controller 300, the cryptographic accelerator 400, the boot controller 500 and the application processor are all connected to the on-chip bus 150 and configured to communicate over the on-chip bus. The first, second and further random access key memories 110, 111, 112 are connected to respective first, second and further key RAM controllers 120, 121, 122 via respective memory busses 130, 131, 132. The first and second multimedia interfaces 100, 101 and the further on-chip processor 102 are connected to respective first, second and further key RAM controllers 120, 121, 122 via respective private busses 140, 141, 142, whereby the first, second and further key RAM controllers can provide run-time access of the first and second multimedia interfaces 100, 101 and the further on-chip processor 102 to the respective device keys in the respective random access key memories 110, 111, 112. The first key RAM controller 120, the second key RAM controller 121 and the further key RAM controller 122 are three instantiations of a single type key RAM controller. The first key RAM 110, the second key RAM 111 and further key RAM 112 are three instantiations of a single type key RAM. The design of the semiconductor device 10 may thus be simplified, as the first, second and further key RAM controllers 120, 121, 122 and the first, second and further RAMs 110, 111, 112 may substantially be designed as standard components and may use a uniform access control method.

The semiconductor device 10 may thus be programmed with one or more device keys in a flexible and convenient manner. The device keys may hereby be programmed to suit a specific applications processor, alleviating the need of prior art devices to provide a large plurality, e.g. six or more, different dedicated one-time programmable fuse arrays to allow storing device keys of different types on the chip. The device manufacturer may hereby effectively select only a subset of device keys to be programmed before actual delivery to an OEM manufacturer, while the device manufacturer may support a wide variety of combinations of on-chip processors with device key protection with the same hardware design of the semiconductor device 10. Further, the programming of the first device key and the second device key may be performed by different parties, e.g. the device manufacturer licensed for one type of multimedia interface, and the OEM manufacturer licensed for another type of multimedia interface.

In embodiments with a cryptographic accelerator 400, the cryptographic accelerator 400 is arranged to encrypt, e.g., the first and second device keys using the master key before programmed into the first and second non-volatile storage elements 210, 211 and to decrypt the first and second device keys when retrieved from into the first and second non-volatile storage elements 210, 211 during boot such that the device keys can be stored in non-encrypted form by the boot controller 500 and the first and second key RAM controllers 120, 121 in the first and second random access key memories 110, 111 at boot-time.

The fuse bank 200 may further have a plurality of lock fuses, one or more for each entry in the key directory. Each lock fuse may be conditioned by the boot controller 500 when a device key is programmed in the fuse bank 200. The semiconductor device 10 may thus, after having been programmed with the first and second device key, comprise at least a first and second lock fuse arranged to prevent changing the first device key after the first device key has been programmed, and to prevent changing the second device key after the second device key has been programmed. Hereby, the integrity of any programmed device keys may be maintained. One lock fuse may be provided for each programmed device key. Alternatively, lock fuses may be provided for predetermined parts of the fuse bank 200, and all lock fuses associated with the parts used for programming one or more device keys may be locked.

In an embodiment, the semiconductor device is capable to operate, prior to being programmed with one or more device keys, in a test mode wherein the fuse bank controller inhibits access to predetermined parts of the fuse bank 200. Hereto, one or more test fuses are provided in the fuse bank 200, or in an alternative embodiment on the semiconductor device but separately from the fuse bank 200. This allows to test the on-chip processors 100, 101, 102 and the associated key RAM controllers and key RAMs with test keys before the semiconductor device is programmed with a device key, and may thus prevent license fees being paid for device keys that are programmed in a semiconductor device that is rejected before being sold and/or used. After the testing is completed, the test mode is disabled and the semiconductor device may be released for programming. In an embodiment, the test mode can no longer be activated after it has been disabled. This prevents any non-authorized use of any of the on-chip processors in the field, e.g., by a person trying to misuse a semiconductor device with test keys.

In an embodiment, the semiconductor device is capable to operate in one or more field return modes wherein the fuse bank controller inhibits access to one or more device keys and/or to the master key stored in the fuse bank 200. Hereto, one or more field return fuses are provided in the fuse bank 200, or in an alternative embodiment on the semiconductor device but separately from the fuse bank 200. In an embodiment, the field return mode can no longer be de-activated after it has been activated. This may allow to perform some root cause determination on faulty semiconductor devices that have been returned to the device manufacturer or the OEM manufacturer, while preventing any non-authorized access to the programmed device keys.

In an embodiment, the semiconductor device is capable of detecting external monitoring, tampering or other failure of the semiconductor device wherein the fuse bank controller inhibits access to one or more device keys and/or to the master key stored in the fuse bank 200. Hereto, tamper detection circuits are provided on the semiconductor device and a tamper detection signal is provided to the fuse bank controller. This may prevent unauthorized access to and/or use of any programmed device keys.

The example shown in FIG. 2 provides one out of many possible examples of a semiconductor device 10, comprising a plurality of on-chip processors 100, 101, 102, a plurality of key RAMs 110, 111, 112, a plurality of key RAM controllers 120, 121, 122, a fuse bank 200, a fuse bank controller 300 and a boot controller 500; the fuse bank 200 comprising a plurality of fuses 220. The boot controller 500 is arranged to, during a first programming stage, receive a first device key 210 for later use in a first key-protected processing by a first on-chip processor 100 of the plurality of on-chip processors 100, 101, 102, a size of the first device key and a type of the first device key, allocate a first array of fuses in the fuse bank 200 in dependence on the size of the first device key 210 for storing the first device key in the fuse bank 200, allocate a further array of fuses of the fuse bank for storing a key directory 230, and control the fuse bank controller 300 to program the first device key 210 into the fuse bank 200 and to register a first key information in the key directory 230, the first key information comprising a size and a location of the first array and, in an embodiment the type of the first device key. The boot controller 500 is arranged to, during boot-time, control the fuse bank controller 300 to retrieve the first key information from the key directory 230 in the fuse bank 200, control the fuse bank controller 300 to retrieve the first device key 210 from the fuse bank 200 in dependence on the first key information, and provide the first device key 210 to a first key RAM controller 120 of the plurality of key RAM controllers, associated with a first key RAM 110 of the plurality of key RAMs. The fuse bank controller 300 is arranged to, during the first programming stage, receive the first key information and the first key 210 from the boot controller 500, program the first array of fuses with the first device key 210 in dependence on the first key information, and program the first key information in the key directory 230 in the fuse bank 200. The fuse bank controller 300 is arranged to, during boot-time, retrieve the first key information from the key directory 230 under control of the boot controller 500), provide the first device key information to the boot controller 500, retrieve the first device key 210 from the fuse bank 200 under control of the boot controller 500, and provide the first device key to the boot controller 500. The fuse bank controller 300 is arranged to, during run-time, prevent access to the first device key 210 in the fuse bank 200. The first key RAM controller 120 is arranged to, during boot-time, receive the first device key from the boot controller 500 and store the first device key in the first key RAM 110. The first key RAM controller 120 is arranged to, during run-time, restrict access to the first device key in the first key RAM 110 to exclusive access by the first on-chip processor 100. The first on-chip processor 100 is arranged to, during run-time, retrieve the first device key from the first key RAM 110 and use the first device key in the first key-protected processing.

Hereby, a plurality of fuses of the, on-chip, fuse bank are available and configurable for device key storage associated with respective on-chip processors, such as video interfaces. The fuse bank may thus contain one or more device keys as well as a key directory to indicate which device keys have been programmed. Each one of the device keys may be programmed by either the manufacturer of the semiconductor device or the OEM during manufacturing of the semiconductor device or an electronic module having the semiconductor device. The device keys are optionally encrypted against a chip-specific master key. A key RAM may be connected as a private RAM to each on-chip processor, e.g., to each video interface, to store the device keys at run-time. Each private RAM may also be connected to a, standardised, key RAM Controller. During boot of the semiconductor device, the on-chip boot controller optionally may use a cryptographic accelerator to decrypt the device keys from the fuses and load each device key via the associated key RAM controller to the required private RAM. This operation may be guided by a key directory in the fuse bank (which may also be referred to as fuse region). After loading is complete, the on-chip boot controller may lock the fuses in the fuse bank against further access and may lock the key RAMs so that only the associated on-chip processor has access to the device key stored therein during run-time.

The semiconductor device may thus comprise a large plurality of on-chip processors of various types, which are effectively activated by the programmed device keys. Hereby, flexibility is improved. Using a fuse bank according to an embodiment allows designing and manufacturing a single semiconductor device version having a large plurality of different on-chip processors on the chip, which may result in cost reduction compared to designing and manufacturing different semiconductor devices with different sets of on-chip processors and each having their associated dedicated fuse arrays.

At least one of the first, second and further on-chip processors may comprise a multimedia interface, the multimedia interface being protected with a device key obtainable from a multimedia licensing authority for forming the first, second or further device key respectively. The multimedia interface may comprise or consist of a HDMI receiver or a HDMI transmitter, and the device key may be a HDCP device key. The HDCP key may be a so-called HDCP v1 keys licensed from the DCP licensing authority. The multimedia interface may comprise or consist of a MediaLB (MLB) interface, and the device key may be a DTCP device key licensed from the DTLA licensing authority.

Figure 3:
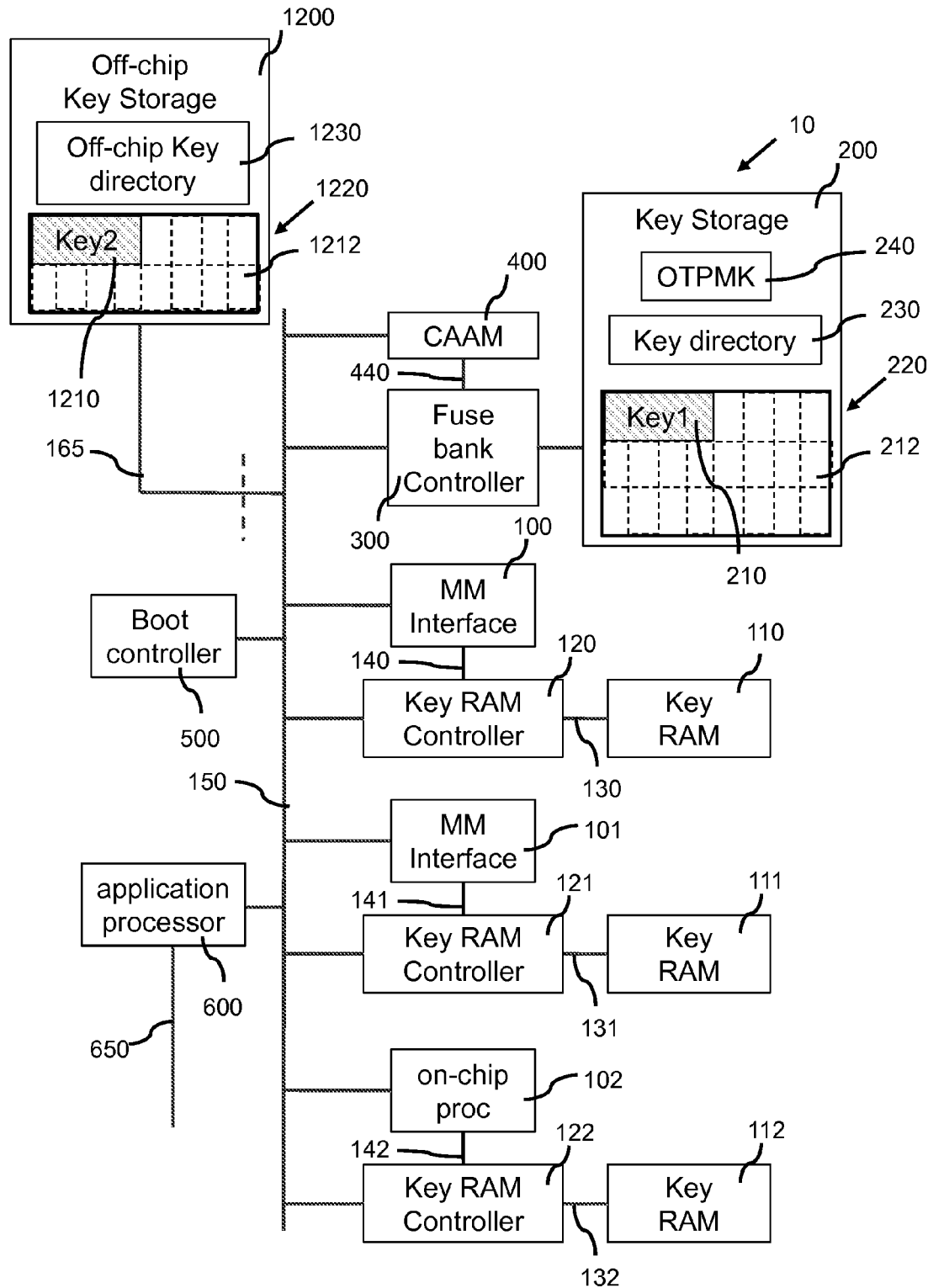

FIG. 3 schematically shows an example of another embodiment of a semiconductor device 10 having plurality of on-chip processors capable to perform to device key protected processing. The plurality of on-chip processors comprises a plurality of a plurality of multimedia interfaces and a plurality of further on-chip processors with device key protection. The example shown in FIG. 3 differs from that in FIG. 2 in that the semiconductor device 10 is arranged to cooperate with an external memory 1200 for storing one or more device keys. In a further embodiment, the boot controller 500 cooperates with an external memory controller to access the external memory. The external memory 1200 comprises a plurality of non-volatile memory elements. A further device key area 1212 is reserved within the non-volatile memory 1200 for storing device keys, and a further key directory area 1230 is reserved within the non-volatile memory 1200 for storing a further key directory with further device key information. In the following, the same reference numeral 1230 will be used to refer to the further key directory area 1230 and to the further key directory 1230. The external memory 1200 may e.g. be (part of) a flash memory, an SD card, an MMC card, a hard drive or a cloud storage unit.

The boot controller 500 of the embodiment of FIG. 3 is arranged to cooperate with the fuse bank controller 300 and the cryptographic accelerator 400 to encrypt a device key and to store the device key in encrypted form in the external memory 1200 and to register device key information in the external memory 1200. Hereby, further device keys may be provisioned also after the, on-chip, fuse bank 200 is exhausted, allowing for example to keep a relatively small size for the on-chip fuse bank 200. Also, it allows the semiconductor manufacturer and/or the OEM manufacturer to select whether to program further device keys in the, on-chip, fuse bank 200 or external memory 1200 for other technical or non-technical reasons.

Hereto, the boot controller 500 is arranged to, during a further programming stage, receive a further device key 1210 for later use in a further key-protected processing by a further on-chip processor 102 of the plurality of on-chip processors 100, 101, 102, a size of the further device key and a type of the further device key, provide the further device key and the master key, to the cryptographic accelerator 400 for encrypting the further device key with the master key, receive the further device key in encrypted form from the cryptographic accelerator 400, allocate an array of non-volatile memory elements in the external memory 1200 in dependence on the size of the further device key 1210 in encrypted form for storing the further device key in encrypted form in the external memory 1200, program the further device key 1210 in encrypted form into the external memory, allocate a further array of non-volatile memory elements in the external memory 1200 for storing a further key directory 1230, register a further key information in the further key directory 1230, the further key information comprising a size and a location of the further array and the type of the further device key 1210. Further the boot controller 500 is arranged to, during boot-time, retrieve the further key information from the further key directory from external memory 1200, retrieve the further device key 1210 in encrypted form from the external memory 1200 in dependence on the further key information retrieved from the further key directory, provide the further device key in encrypted form to the cryptographic accelerator 400 for decrypting the further device key with the master key, receive the further device key after being decrypted from the cryptographic accelerator 400), and provide the further device key to a further key RAM controller 122 of the plurality of key RAM controllers, associated with a further key RAM 112 of the plurality of key RAMs. The further key RAM controller 122 is arranged to, during boot-time, receive the further device key from the boot controller 500 and store the further device key in the further key RAM 112, and, during run-time, restrict access to the further device key in the further key RAM 112 to exclusive access by the further on-chip processor 102. The further on-chip processor 102 arranged to, during run-time, retrieve the further device key from the further key RAM 112 and use the further device key in the further key-protected processing.

According to an example of a system as shown in FIG. 2, the semiconductor device 10 comprises five on-chip processors: one DTCP processor, two HDCP v1 processors (one HDMI receiver and one HDMI transmitter), one CPRM (content protection for recordable media) processor, and a cryptographic accelerator implementing HDCP v2 (transmit and receive) as well as TLS (transport layer security) client authentication. The semiconductor device thus requires up to seven different device keys: one for DTCP, two for HDCP v1, one for CPRM, one for HDCP v2 transmit, one for HDCP v2 receive, one for CPRM, and one for TLS client authentication. The semiconductor device manufacturer plans to offer the semiconductor device pre-programmed with device keys in diverse market segments, each of which requires a different selection, both in type and number, of the seven possible device keys. A first OEM may use only the two HDMI interfaces in a repeater device, a second OEM may use TLS client authentication to access an online subscription service, and HDCP v2 to protect transmission of content acquired from the online subscription service, and a third OEM may use HDCP v2 to receive protected content from a network connection, CPRM to extract protected content from recordable media and DTCP to transmit protected content to an audiovisual display system. In a prior art example, this would require seven dedicated fuse arrays to be able to store any combination of possible device key types (see table below) to accommodate any application scenario: a DTCP fuse array of (480+1056=) 1536 fuses; two HDCP v1 fuse arrays of (2240+40=) 2280 fuses each; a CPRM fuse array of 900 fuses; a HDCP v2 transmit fuse array of (128+3096=) 3224 fuses; a HDCP v2 receive fuse array of (1152+4176=) 5328 fuses; and a TLS client authentication fuse array of 4096 fuses. Such prior art example may thus require a total number of (1536+2*2280+900+3224+5328+4096=) 19644 fuses requiring a large die area, In an exemplary embodiment, the on-chip fuse bank 200 need accommodate only the largest relevant subset of the seven possible device keys, as well as a small number of fuses for the key directory. The pre-programmed semiconductor device for the first OEM contains two HDCPv1 device keys requiring 2240 fuses each or (2280+2280=) 4560 fuses together, while the device for the second OEM contains one TLS client authentication device key and one HDCP v2 transmitter device key requiring (4096+3224=) 7320 fuses, and the device for the third OEM contains one HDCP v2 receiver device key, one DTCP device key and one CPRM device key requiring (5328+1536+900=) 7764 fuses. To meet these requirements, the semiconductor device manufacturer configures a device key array 212 comprising a total of only 7764 fuses, requiring less than 40% of the die area of the prior art.

The device keys may comprise data elements of different types, such as secret data elements as well as trusted data elements. Some, non-limiting, examples are given in the table below:

| Key type | Secret data (bits) | | Trusted data (bits) | | Bits |
|---|---|---|---|---|---|
| DTCP | Device key secret part | 480 | Device certificate | 1056 | 1536 |
| HDCP 1.x | Device key secret part | 2240 | KSV | 40 | 2280 |
| HDCP 2.0 Tx | Global secret | 128 | DCP public key | 3096 | 3224 |
| HDCP 2.0 Rx | Global secret & Device private key | 1152 | Device certificate | 4176 | 5328 |
| CPRM | Device key | 900 (approx..) | | | 900 (approx.) |
| TLS client authentication | RSA-2048 private key | 4096 | | | 4096 |

Figure 4:
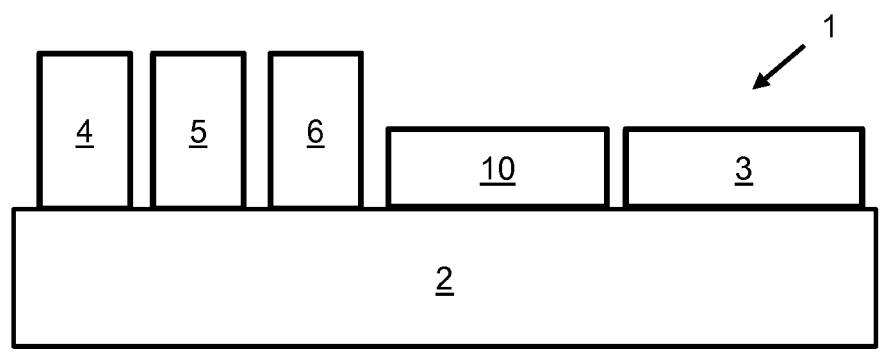

FIG. 4 schematically shows an example of an embodiment of a video interface module 1. The video interface module 1 comprises a printed circuit board 2, a semiconductor device 10, a memory device 3, a first video interface connector 4, a second video interface connector 5 and a third video interface connector 6. The semiconductor device 10 corresponds to the semiconductor device shown in FIG. 3. The memory device 3 comprises the external memory 1200 described with reference to FIG. 3. The memory device 3 is connected to the external bus 165 of the semiconductor device 10 for communicating with the semiconductor device 10. The first video interface connector 4 is connected to the semiconductor device 10 for receiving HDMI signals protected with HDCP. A first array of fuses of fuse bank 200 of the semiconductor device 10 is hereto programmed with a first HDCP device key for an on-chip HDMI receiver of the semiconductor device 10, and the key directory 230 indicates so. The second video interface connector 5 is connected to the semiconductor device 10 for transmitting HDMI signals protected with HDCP. A second array of fuses of fuse bank 200 of the semiconductor device 10 is hereto programmed with a second HDCP device key for an on-chip HDMI transmitter on the semiconductor device 10, and the key directory 230 indicates so. The third video interface connector 6 is connected to the semiconductor device 10 for receiving and transmitting first multimedia signals protected with DTCP. The external memory 1200 in the memory device 3 hereto comprises a further DTCP device key, and the further key directory 1230 indicates so.

Figure 5:
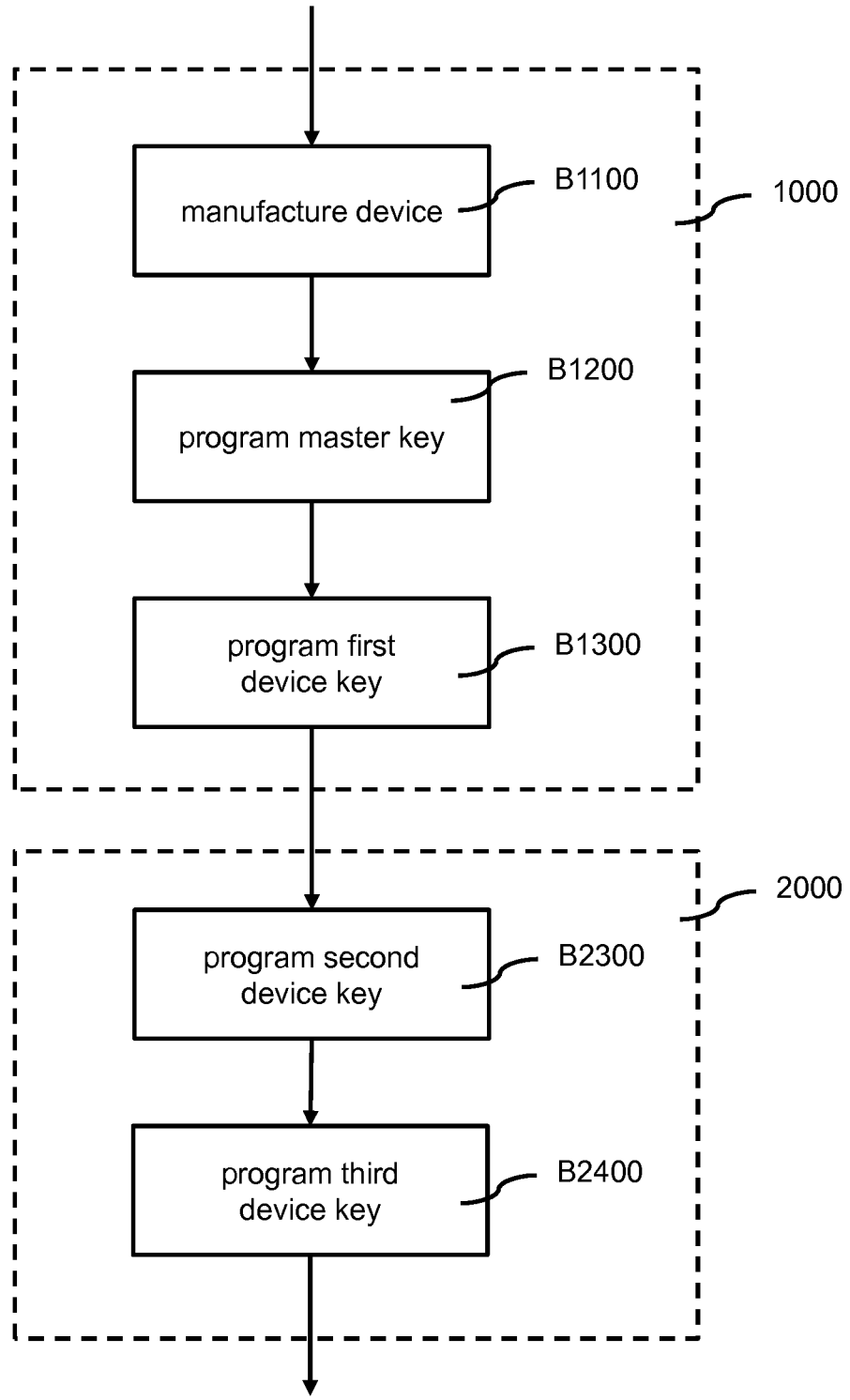
FIG. 5 schematically shows an example of an embodiment of a method of manufacturing a video interface module having a semiconductor device having two multimedia interfaces with device key protection.

FIG. 5 schematically shows an example of an embodiment of a method of manufacturing a video interface module 1 having a semiconductor device 10. In the example shown, a first part 1000 of the method is performed by a device manufacturer of a semiconductor device 10 and a second part 2000 of the method is performed by an OEM manufacturer, who manufactures a video interface module 1 using the semiconductor device 10 provided by the device manufacturer. In this example, the video interface module 1 is as shown as in FIG. 4.

The first part 1000 of the method comprises manufacturing B1100 a semiconductor device 10 according to an embodiment. In this example, a semiconductor device 10 is provided as a semiconductor device. In this example, the semiconductor device 10 has three multimedia interfaces: a HDMI transmitter (first multimedia interface 100), a HDMI receiver (second multimedia interface 101) and a MLB interface (further on-chip processor 102). The semiconductor device 10 thus comprises a fuse bank 200 comprising a device key array 212 for storing one or more device keys, and a key directory 230 for indicating how many device keys and which type of device keys have been programmed in the device key array 212. The semiconductor device 10 further comprises a non-volatile master key storage element 240 for storing a chip-specific unique master key and a cryptographic accelerator 400 for encrypting and decrypting the one or more device keys using the master key. After the semiconductor device 10 has been provided, the master key is programmed in block B1200 into the semiconductor device with a master key value by the device manufacturer. Then, the first device key is programmed by the device manufacturer in block B1300 into the semiconductor device with a first device key value, that is, during the programming, encrypted by the cryptographic accelerator 400 with the master key before being stored in a first array of fuses 210 allocated within the device key array 212 in the fuse bank 200. The first device key value has been obtained by the device manufacturer as a HDCP device key from the DCP licensing authority. The semiconductor device 10 is hereby substantially configured for use with its first multimedia interface 100 as a HDMI audio/video transmitter interface, whereas the second multimedia interface 101 and further co-processor 102 are not (yet) configured.

The semiconductor device 10 is then delivered by the device manufacturer to an OEM manufacturer. The OEM manufacture programs, in block 2300, the second device key into the semiconductor device with a second device key value, that is, during the programming, encrypted by the cryptographic accelerator 400 with the master key before being stored in a second array of fuses 211 allocated within the device key array 212 in the fuse bank 200. The second device key value has been obtained by the OEM manufacturer as a HDCP device key from the DCP licensing authority. Then the OEM programs, in block B2400, the third device key into the external memory with a third device key value, that is, during the programming, encrypted by the cryptographic accelerator 400 with the master key before being stored in a first array of non-volatile storage elements 1210 allocated within the further device key array 1212 in the external memory 1200. The third device key value has been obtained by the OEM as a DTCP device key from the DTLA licensing authority. The semiconductor device 10 is hereby substantially configured for use with its second multimedia interface 101 as a HDMI receiver interface and its further co-processor 102 as a MLB DTCP interface.

The semiconductor device 10 thus stores and protects a combination of device keys licensed by two different stakeholders, i.e. in this example, a HDCP device key licensed by the device manufacturer from the DCP licensing authority, another HDCP device key licensed by the OEM from the DCP licensing authority and a DTCP device key licensed by the OEM manufacturer from the DTLA licensing authority.

It will be understood that the above examples may be varied. Each party may provision zero or more keys until the storage in the fuse bank 200 and the external memory 1200 is exhausted and/or until a maximum number of device keys are programmed, e.g., until device keys are programmed for all on-chip processors and the applications capable of running thereon.

Although in the examples above, multimedia processors and video interfaces were mentioned as examples of on-chip processor(s), one or more on-chip processors may alternatively or additionally be of a different type. For example, an on-chip processor may comprise a firmware update unit, the firmware update unit being protected with an AES key forming the associated device key.

Embodiments provide semiconductor devices that are capable to be programmed with one or more device keys, semiconductor devices that are programmed with one or more device keys, as well as semiconductor devices that are programmed with one or more devices keys and also still programmable with additional one or more device keys, and electronic modules having such semiconductor devices.

The invention may also be implemented in a computer program for running on a computer system, at least including code portions for performing steps of a method according to the invention when run on a programmable apparatus, such as a computer system or enabling a programmable apparatus to perform functions of a device or system according to the invention. The computer program may for instance include one or more of: a subroutine, a function, a procedure, an object method, an object implementation, an executable application, an applet, a servlet, a source code, an object code, a shared librarydynamic load library and/or other sequence of instructions designed for execution on a computer system. The computer program may be provided on a data carrier, such as a CD-rom or diskette, stored with data loadable in a memory of a computer system, the data representing the computer program. The data carrier may further be a data connection, such as a telephone cable or a wireless connection.

In the foregoing specification, the invention has been described with reference to specific examples of embodiments of the invention. It will, however, be evident that various modifications and changes may be made therein without departing from the broader spirit and scope of the invention as set forth in the appended claims. For example, the connections may be an type of connection suitable to transfer signals from or to the respective nodes, units or devices, for example via intermediate devices. Accordingly, unless implied or stated otherwise the connections may for example be direct connections or indirect connections.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Some of the above embodiments, as applicable, may be implemented using a variety of different information processing systems. For example, although FIG. 2 and the discussion thereof describe an exemplary information processing architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Also for example, in one embodiment, the illustrated elements of system 1 are circuitry located on a single integrated circuit or within a same device. Alternatively, system 1 may include any number of separate integrated circuits or separate devices interconnected with each other.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Also, the invention is not limited to physical devices or units implemented in non-programmable hardware but can also be applied in programmable devices or units able to perform the desired device functions by operating in accordance with suitable program code. Furthermore, the devices may be physically distributed over a number of apparatuses, while functionally operating as a single device. Also, devices functionally forming separate devices may be integrated in a single physical device.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:
1. A semiconductor device, comprising:
a plurality of on-chip processors;
a plurality of key RAMs;
a plurality of key RAM controllers;
a fuse bank, wherein the fuse bank includes a plurality of fuses;
a fuse bank controller; and
a boot controller, wherein the boot controller is configured to:
during a first programming stage, receive a first device key for later use in a first key-protected processing by a first on-chip processor of the plurality of on-chip processors, a size of the first device key and a type of the first device key, allocate a first array of fuses in the fuse bank in dependence on the size of the first device key for storing the first device key in the fuse bank, allocate a further array of fuses of the fuse bank for storing a key directory, and control the fuse bank controller to program the first device key into the fuse bank and to register a first key information in the key directory, the first key information comprising a size and a location of the first array and the type of the first device key, and
during a boot-time, control the fuse bank controller to retrieve the first key information from the key directory in the fuse bank, control the fuse bank controller to retrieve the first device key from the fuse bank in dependence on the first key information, and provide the first device key to a first key RAM controller of the plurality of key RAM controllers, associated with a first key RAM of the plurality of key RAMs;
wherein the fuse bank controller is configured to:
during the first programming stage, receive the first key information and the first key from the boot controller, program the first array of fuses with the first device key in dependence on the first key information, and program the first key information in the key directory in the fuse bank,
during the boot-time, retrieve the first key information from the key directory under control of the boot controller, provide the first device key information to the boot controller, retrieve the first device key from the fuse bank under control of the boot controller, and provide the first device key to the boot controller, and
during a run-time, prevent access to the first device key in the fuse bank;
wherein the first key RAM controller is configured to:
during the boot-time, receive the first device key from the boot controller and store the first device key in the first key RAM, and
during the run-time, restrict access to the first device key in the first key RAM to exclusive access by the first on-chip processor; and
wherein the first on-chip processor is configured to, during the run-time, retrieve the first device key from the first key RAM and use the first device key in the first key-protected processing.

2. A semiconductor device according to claim 1, the fuse bank comprising a first lock fuse arranged to prevent changing the first device key after the first device key has been programmed.

3. A semiconductor device according to claim 1,
wherein the boot controller is configured to:
during a second programming stage, receive a second device key for later use in a second key-protected processing by a second on-chip processor of the plurality of on-chip processors, a size of the second device key and a type of the second device key, allocate a second array of fuses in the fuse bank in dependence on the size of the second device key for storing the second device key in the fuse bank, and control the fuse bank controller to program the second device key into the fuse bank and to register a second key information in the key directory, the second key information comprising a size and a location of the second array and the type of the second device key, and
during the boot-time, control the fuse bank controller to retrieve the second key information from the key directory in the fuse bank, control the fuse bank controller to retrieve the second device key from the fuse bank in dependence on the second key information, and provide the second device key to a second key RAM controller of the plurality of key RAM controllers, associated with a second key RAM of the plurality of key RAMs;
wherein the fuse bank controller is configured to:
during the second programming stage, receive the second key information and the second key from the boot controller, program the second array of fuses with the second device key in dependence on the second key information, and program the second key information in the key directory in the fuse bank, and
during the boot-time, retrieve the second key information from the key directory under control of the boot controller, provide the second device key information to the boot controller, retrieve the second device key from the fuse bank under control of the boot controller, and provide the second device key to the boot controller, and
during the run-time, prevent access to the second device key in the fuse bank;
wherein the second key RAM controller is configured to:
during the boot-time, receive the second device key from the boot controller and store the second device key in the second key RAM, and
during the run-time, restrict access to the second device key in the second key RAM to exclusive access by the second on-chip processor; and
wherein the second on-chip processor is configured to, during the run-time, retrieve the second device key from the second key RAM and use the second device key in the second key-protected processing.

4. A semiconductor device according to claim 3, the fuse bank comprising a lock fuse arranged to prevent changing the second device key after the second device key has been programmed.

5. A semiconductor device according to claim 1, comprising a cryptographic accelerator and an array of master key fuses for storing a master key,
wherein the boot controller is configured to:
during a master key programming stage, receive a master key and control the fuse bank controller to program the master key into the array of master key fuses, and
during a second programming stage, provide a second device key to the cryptographic accelerator for encrypting the second device key with the master key from the fuse bank controller, and
during the boot-time, control the cryptographic accelerator to retrieve the second device key in encrypted form and the master key from the fuse bank controller and decrypt the second device key with the master key, and receive the second device key from the cryptographic accelerator;
wherein the fuse bank controller is configured to:
during the master key programming stage, receive the master key from the boot controller and program the master key into the array of master key fuses,
during a third programming stage, read the master key from the array of master key fuses, provide the master key to the cryptographic accelerator for encrypting the second device key provided by the boot controller with the master key, and receive the second device key in encrypted form from the cryptographic accelerator for using the second device key in encrypted form in performing the third programming stage, and during the boot-time, after having retrieved the second device key in encrypted form, provide the second device key in encrypted form and the master key to the cryptographic accelerator for decrypting the second device key with the master key to obtain the second device key;

wherein the cryptographic accelerator is configured to:

during a fourth programming stage, receive a third device key from the boot controller and the master key from the fuse bank controller, encrypt the third device key with the master key to obtain the third device key in encrypted form, and provide the third device key in encrypted form to the fuse bank controller, and during the boot-time, receive the third device key in encrypted form and the master key from the fuse bank controller, decrypt the third device key in encrypted form to obtain the third device key, and provide the third device key after being decrypted to the boot controller.

6. A semiconductor device according to claim 5, the fuse bank controller configured to use the first or the second device key in encrypted form in programming the first or second device key in the fuse bank.

7. A semiconductor device according to claim 5, configured to cooperate with an external memory comprising a plurality of non-volatile memory elements, wherein the boot controller is configured to:

during a further programming stage, receive a further device key for later use in a further key-protected processing by a further on-chip processor of the plurality of on-chip processors, a size of the further device key and a type of the further device key, provide the further device key to the cryptographic accelerator for encrypting the further device key with the master key, receive the further device key in encrypted form from the cryptographic accelerator, allocate an array of non-volatile memory elements in the external memory in dependence on the size of the further device key in encrypted form for storing the further device key in encrypted form in the external memory, program the further device key in encrypted form into the external memory, allocate a further array of non-volatile memory elements in the external memory for storing a further key directory, register a further key information in the further key directory, the further key information comprising a size and a location of the further array and the type of the further device key, and during the boot-time, retrieve the further key information from the further key directory from external memory, retrieve the further device key in encrypted form from the external memory in dependence on the further key information retrieved from the further key directory, provide the further device key in encrypted form to the cryptographic accelerator for decrypting the further device key with the master key, receive the further device key after being decrypted from the cryptographic accelerator, and provide the further device key to a further key RAM controller of the plurality of key RAM controllers, associated with a further key RAM of the plurality of key RAMs;

wherein the further key RAM controller is configured to:

during the boot-time, receive the further device key from the boot controller and store the further device key in the further key RAM, and during the run-time, restrict access to the further device key in the further key RAM to exclusive access by the further on-chip processor; and wherein the further on-chip processor is configured to, during the run-time, retrieve the further device key from the further key RAM and use the further device key in the further key-protected processing.

8. A semiconductor device according to claim 7, the further non-volatile memory elements being further one-time programmable non-volatile memory elements, and the external memory comprising a further lock fuse arranged to prevent changing the further device key after the further device key has been programmed.

9. A semiconductor device according to claim 5, the cryptographic accelerator being integrated in one of the first, a second or a further on-chip processor.

10. A semiconductor device according to claim 5, the cryptographic accelerator being integrated in the boot controller or in the fuse bank controller.

11. A semiconductor device according to claim 9, wherein at least one of the first, second and further on-chip processors comprises a multimedia interface.

12. A semiconductor device according to claim 1, wherein at least one of the first, a second or a further on-chip processor comprises a multimedia interface, the multimedia interface being protected with a third device key obtainable from a multimedia licensing authority for forming the first, a second or a further device key respectively.

13. A semiconductor device according to claim 1, wherein the first on-chip processor comprises a firmware update unit, the firmware update unit being protected with an advanced encryption standard (AES) key forming the first device key.

14. A semiconductor device according to claim 1, the semiconductor device further comprising a tamper detection circuit arranged to detect external monitoring, tampering or other failure of the semiconductor device and to provide a tamper detection signal to the fuse bank controller upon such detection, the fuse bank controller being arranged to inhibit access to one or more device keys or to a master key stored in the fuse bank.

15. A semiconductor device according to claim 7, the semiconductor device implemented in an electronic module, the electronic module comprising a memory device and the external memory, the memory device being external to the semiconductor device.

16. A semiconductor device according to claim 15, wherein at least the first device key being programmed in the fuse bank of the semiconductor device and the further device key being programmed in encrypted form in the external memory.

17. A method of programming a semiconductor device, wherein the semiconductor device includes:

a plurality of on-chip processors;

a plurality of key RAMs;

a plurality of key RAM controllers;

a fuse bank, wherein the fuse bank includes a plurality of fuses;

a fuse bank controller; and a boot controller, wherein the boot controller is configured to:

during a first programming stage, receive a first device key for later use in a first key-protected processing by a first on-chip processor of the plurality of on-chip processors, a size of the first device key and a type of the first device key, allocate a first array of fuses in the fuse bank in dependence on the size of the first device key for storing the first device key in the fuse bank, allocate a further array of fuses of the fuse bank for storing a key directory, and control the fuse bank controller to program the first device key into the fuse bank and to register a first key information in the key directory, the first key information comprising a size and a location of the first array and the type of the first device key, and during a boot-time, control the fuse bank controller to retrieve the first key information from the key directory in the fuse bank, control the fuse bank controller to retrieve the first device key from the fuse bank in dependence on the first key information, and provide the first device key to a first key RAM controller of the plurality of key RAM controllers, associated with a first key RAM of the plurality of key RAMs;

wherein the fuse bank controller is configured to:

during the first programming stage, receive the first key information and the first key from the boot controller, program the first array of fuses with the first device key in dependence on the first key information, and program the first key information in the key directory in the fuse bank, during the boot-time, retrieve the first key information from the key directory under control of the boot controller, provide the first device key information to the boot controller, retrieve the first device key from the fuse bank under control of the boot controller, and provide the first device key to the boot controller, and during a run-time, prevent access to the first device key in the fuse bank, wherein the first key RAM controller is configured to:

during the boot-time, receive the first device key from the boot controller and store the first device key in the first key RAM, and during the run-time, restrict access to the first device key in the first key RAM to exclusive access by the first on-chip processor; and wherein the first on-chip processor is configured to, during the run-time, retrieve the first device key from the first key RAM and use the first device key in the first key-protected processing, the method comprising:

programming, by a device manufacturer of the semiconductor device, at least the first device key in the fuse bank during the first programming stage.

18. A method according to claim 17 further comprising programming, by a manufacturer of an electronic module comprising the semiconductor device, a second device key in the fuse bank during a second programming stage.

19. A method according to claim 17 wherein the semiconductor device is configured to cooperate with an external memory, wherein a memory device includes the external memory, the memory device being external to the semiconductor device, the method further comprising programming, by a manufacturer of an electronic module comprising the semiconductor device, a further device key received during a further programming stage in the external memory in the memory device, in encrypted form, during the further programming stage.

* * * * *